United States Patent [19]

Foropoulos, Jr. et al.

[11] Patent Number: 5,098,682
[45] Date of Patent: Mar. 24, 1992

[54] DEHYDRATION OF PLUTONIUM OR NEPTUNIUM TRICHLORIDE HYDRATE

[75] Inventors: Jerry Foropoulos, Jr.; Larry R. Avens, both of Los Alamos; Eddie A. Trujillo, Espanola, all of N. Mex.

[73] Assignee: The United States of America as represented by the United States Department of Energy, Washington, D.C.

[21] Appl. No.: 755,280

[22] Filed: Sep. 5, 1991

[51] Int. Cl.⁵ .............................................. C01G 56/00
[52] U.S. Cl. ..................................... 423/251; 423/19; 423/250
[58] Field of Search ........................ 423/250, 251, 19

[56] References Cited

U.S. PATENT DOCUMENTS

| | | | |
|---|---|---|---|
| 2,578,416 | 12/1951 | Fried et al. | 423/250 |
| 2,859,097 | 11/1958 | Davidson et al. | 423/251 |
| 2,860,032 | 11/1958 | Davidson et al. | 423/251 |
| 2,860,948 | 11/1958 | Fried | 423/19 |
| 3,700,710 | 10/1972 | Mottus et al. | 252/431 |
| 4,519,986 | 5/1985 | Pastor et al. | 423/19 |
| 4,859,441 | 8/1989 | Lambard | 423/19 |

OTHER PUBLICATIONS

Freeman et al., *J. Inorg. Nucl. Chem.*) 7, 224–227 (1958).
Cleveland, *The Chemistry of Plutonium*, pp. 353–358, Gordon and Breach Science Publ. (1970) New York.

*Primary Examiner*—Edward A. Miller
*Attorney, Agent, or Firm*—Bruce H. Cottrel; Paul D. Gaetjens; William R. Moser

[57] ABSTRACT

A process of preparing anhydrous actinide metal trichlorides of plutonium or neptunium by reacting an aqueous solution of an actinide metal trichloride selected from the group consisting of plutonium trichloride or neptunium trichloride with a reducing agent capable of converting the actinide metal from an oxidation state of +4 to +3 in a resultant solution, evaporating essentially all the solvent from the resultant solution to yield an actinide trichloride hydrate material, dehydrating the actinide trichloride hydrate material by heating the material in admixture with excess thionyl chloride, and recovering anhydrous actinide trichloride is provided.

10 Claims, No Drawings

DEHYDRATION OF PLUTONIUM OR NEPTUNIUM TRICHLORIDE HYDRATE

This invention is the result of a contract with the Department of Energy (Contract No. W-7405-ENG-36).

FIELD OF THE INVENTION

The present invention relates to the field of actinide chemistry and particularly to the chemistry of plutonium and neptunium.

BACKGROUND OF THE INVENTION

Anhydrous actinide trichlorides such as plutonium trichloride and neptunium trichloride are important starting materials for chemical synthesis. Plutonium trichloride can be prepared by a number of methods such as the reaction of either carbon tetrachloride or phosgene with plutonium oxide, the reaction of either hydrogen chloride or phosgene with plutonium oxalate, the reaction of plutonium metal with chlorine, the reaction of plutonium hydride with hydrogen chloride, or the reaction of a mixture of ammonium chloride and liquid hydrogen chloride with plutonium oxide. While such reactions are all reasonably efficient in producing plutonium trichloride, they suffer from disadvantages such as poor waste minimization and greater radiation exposures to personnel. In addition, when plutonium oxide is used, it must be initially prepared, usually by calcining an oxalate which itself is generally first precipitated from an aqueous solution. Similarly, the use of plutonium hydride or plutonium metal requires that the metal be initially produced. In these cases, the end product of a first multi-step process is used to feed another multi-step process.

One desirable route in the preparation of anhydrous plutonium trichloride would be to use a solution of plutonium in hydrochloric acid. It is previously known that evaporation of such plutonium solutions can yield plutonium chloride hydrate and that the anhydrous product can then be obtained by heating the hydrate in a stream of dry hydrogen chloride. While this method is useful, such a process is generally unsuitable for preparations of the anhydrous product because of the quantities of gas needed and the added difficulties of drying, recycling and/or scrubbing the hydrated HCl by-product. Moreover, attempts to obtain the anhydrous material directly from the aqueous solution simply by evaporation and further heating suffer from significant formation of plutonium oxychloride occurs upon dehydration.

Thionyl chloride, $SOCl_2$, has long been known to produce anhydrous chlorides from many metal hydrates. It has also been used in organic chemistry as a coreactant to remove water from a reaction mixture. The use of thionyl chloride as a dehydrating agent for preparation of anhydrous inorganic chlorides is described by Freeman et al. in J. Inorg. Nucl. Chem., vol. 7, pp.224–227 (1958). However, Freeman et al. report that the process was not applicable to plutonium trichloride. This is in contrast to their work with other chlorides such as thorium, copper, magnesium, or iron, and numerous lanthanide metal chlorides.

Surprisingly, the present inventors have now discovered that thionyl chloride can be used as a dehydrating agent for the conversion of plutonium trichloride hydrate to anhydrous plutonium trichloride, such a process being further applicable to trivalent neptunium trichloride as well.

Accordingly, it is an object of this invention to provide a process of converting plutonium trichloride hydrate to anhydrous plutonium trichloride.

It is a further object of the invention to provide a process of converting neptunium trichloride hydrate to anhydrous neptunium trichloride.

SUMMARY OF THE INVENTION

To achieve the foregoing and other objects, and in accordance with the purposes of the present invention, as embodied and broadly described herein, the present invention provides a process of preparing anhydrous actinide metal trichlorides of plutonium or neptunium by reacting an aqueous solution of an actinide metal trichloride selected from the group consisting of plutonium trichloride or neptunium trichloride with a reducing agent capable of converting the actinide metal from an oxidation state of $+4$ to $+3$ in a resultant solution, evaporating essentially all the solvent from the resultant solution to yield an actinide trichloride hydrate material, dehydrating the actinide trichloride hydrate material by heating the material in admixture with excess thionyl chloride, and recovering anhydrous actinide trichloride. In a preferred process, the thionyl chloride admixed with the hydrate material is a liquid.

DETAILED DESCRIPTION

The present invention concerns the use of thionyl chloride in the dehydration of actinide trichloride hydrates wherein the actinide is plutonium or neptunium to yield the respective anhydrous trichloride.

Aqueous solutions of plutonium trichloride and neptunium trichloride are readily preparedly by dissolution of plutonium compounds and neptunium compounds in hydrochloric acid. However, obtaining the anhydrous product from these solutions has generally proven difficult.

Thionyl chloride is the dehydrating agent used to convert the particular hydrate to the anhydrous materials. Previously, it had been believed that the trivalent plutonium and neptunium systems would not permit the thionyl chloride dehydration process to operate. The thionyl chloride can be admixed with the particular hydrate material as either a gas or a liquid, preferably as a liquid. As a gas, thionyl chloride may accomplish the dehydration of the plutonium chloride hydrate with slow heating, e.g., bypassing thionyl chloride vapor over the solid plutonium chloride hydrate while heating at above about 80° C. One manner of contacting the hydrate and the gaseous thionyl chloride is to distribute the solid upon a porous frit and pass the gas through and around the solid hydrate material. By admixing the thionyl chloride as a liquid in a liquid-solid slurry with the hydrate material, the need for a large reactor volume for gas drying and handling can be avoided. Further, the use of thionyl chloride in the present process of preparing the anhydrous product can reduce or minimize waste products and reduce overall radiation exposure to personnel. Excess thionyl chloride used in the present process can be recycled with the only waste stream including sulfur dioxide and HCl which can be easily scrubbed via reaction with soda lime.

In the present invention, actinide trichloride hydrate material can be converted to the corresponding anhydrous material by heating the hydrate material in admixture with thionyl chloride, said heating at temperatures and for time sufficient to dehydrate said hydrate material.

In a general process of the present invention, an aqueous solution of plutonium trichloride or neptunium trichloride is reacted with a reducing agent capable of converting all of the respective actinide ions to the +3 oxidation state, i.e., any +4 ions will be reduced to the +3 state. The reducing agent can be selected from among hydroxylamine hydrochloride, ascorbic acid, or hydrogen peroxide. Hydroxylamine hydrochloride is preferred as the reducing agent.

After conversion of the actinide ions to the +3 oxidation state, the resultant solution is generally evaporated to dryness to obtain the crystalline trichloride hydrate material.

The crystalline product, i.e., the actinide trichloride hydrate, is then admixed with thionyl chloride and the mixture heated at temperatures and for time sufficient to dehydrate the trichloride material. After the reflux is completed, the remaining excess thionyl chloride is removed under vacuum to leave the anhydrous actinide trichloride. It is sometimes found that residual thionyl chloride will remain adhered to the anhydrous product. This residual dehydrating agent can be removed by heating the resultant product to obtain essentially pure anhydrous actinide trichloride. By "essentially pure" is meant anhydrous plutonium trichloride of at least about 97 percent purity, preferably at least about 98 percent purity. The present invention is more particularly described in the following example which is intended as illustrative only, since numerous modifications and variations will be apparent to those skilled in the art.

EXAMPLE 1

A 350 milliliter (ml) aliquot of plutonium trichloride solution in about 2 Molar aqueous hydrochloric acid (50 g Pu/liter) was treated with 5.1 grams (g) of hydroxylamine hydrochloride ($NH_2OH \cdot HCl$) to reduce the oxidation state of the plutonium from +4 (a reddish-brown solution) to +3 (a blue-green solution). The solution volume was reduced in a three-necked flask under argon flow with stirring and heat to yield plutonium trichloride hydrate as a resultant crystalline product. The crystalline product (14.7 g) was placed into a standard glass reflux distillation apparatus. Excess thionyl chloride (50 ml) was added and the mixture refluxed at 67° C. for about 10 hours. The excess thionyl chloride was then distilled off, leaving 13.7 g of product. The product was placed into a vacuum furnace and heated from ambient temperature to about 500° C. to remove additional traces of thionyl chloride apparently chemically bound to the anhydrous product. The final product was 11.8 g of essentially pure anhydrous plutonium trichloride. Weight loss by thermogravimetric analysis (TGA) was 1% from 50° C. to 600° C. An infrared spectrum of the solid product showed no absorbances attributable to water. Elemental analysis indicated 66.7% Pu and 31.0% Cl with about 1-2% impurities such as alkalis, alkaline earths and traces of silicon and iron.

Although the present invention has been described with reference to specific details, it is not intended that such details should be regarded as limitations upon the scope of the invention, except as and to the extent that they are included in the accompanying claims.

What is claimed is:

1. A process of preparing anhydrous actinide metal trichlorides of plutonium or neptunium comprising:
    reacting an aqueous solution of an actinide metal trichloride selected from the group consisting of plutonium trichloride or neptunium trichloride with a reducing agent capable of converting the actinide metal from an oxidation state of +4 to +3 to yield a resultant solution;
    evaporating essentially all the solvent from the resultant solution to yield an actinide trichloride hydrate material;
    heating the actinide trichloride hydrate material while in admixture with an excess stoichiometric amount of thionyl chloride thereby dehydrating said actinide trichloride hydrate material; and,
    recovering anhydrous actinide trichloride.

2. The process of claim 1 wherein the thionyl chloride is admixed as a liquid.

3. The process of claim 1 wherein the thionyl chloride is admixed as a gas.

4. The process of claim 1 wherein the actinide metal is plutonium.

5. The process of claim 1 wherein the actinide metal is neptunium.

6. The process of claim 4 wherein recovering anhydrous actinide trichloride includes heating under vacuum the product from the dehydration of the actinide trichloride hydrate material whereby to remove essentially all of the thionyl chloride.

7. A process of preparing anhydrous actinide metal trichlorides of plutonium or neptunium comprising:
    heating an actinide trichloride hydrate material while in admixture with excess thionyl chloride thereby dehydrating said actinide trichloride hydrate material; and,
    recovering anhydrous actinide trichloride.

8. The process of claim 7 wherein the thionyl chloride is admixed as a liquid.

9. The process of claim 7 wherein the thionyl chloride is admixed as a gas.

10. The process of claim 7 wherein recovering anhydrous actinide trichloride includes heating under vacuum the product from the dehydration of the actinide trichloride hydrate material whereby to remove essentially all of the thionyl chloride.

* * * * *